(No Model.)
E. A. LELAND.
BRAKE HOSE COUPLING.
No. 412,103. Patented Oct. 1, 1889.
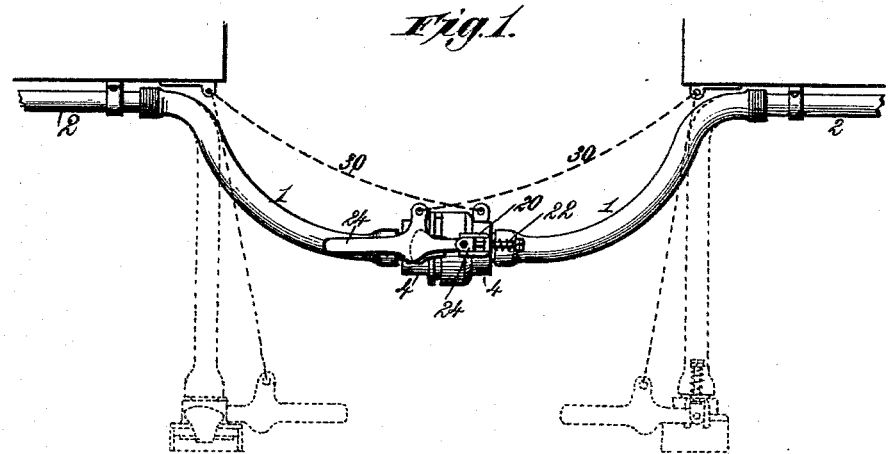
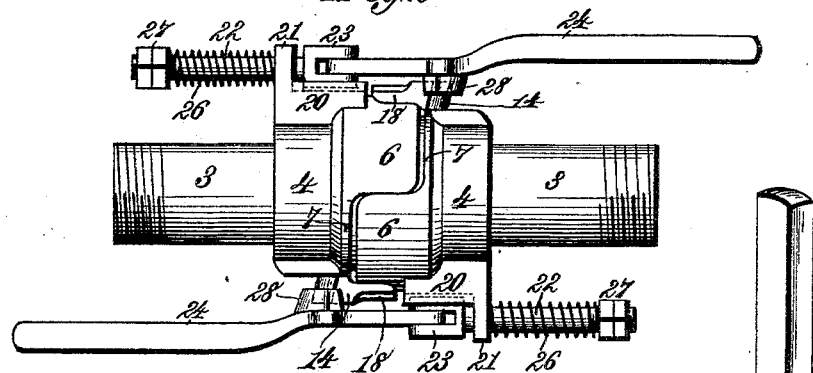
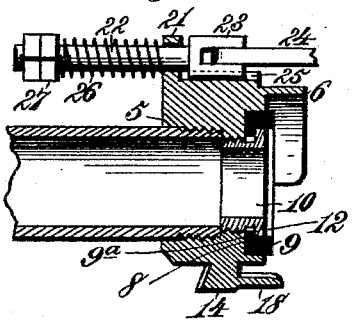
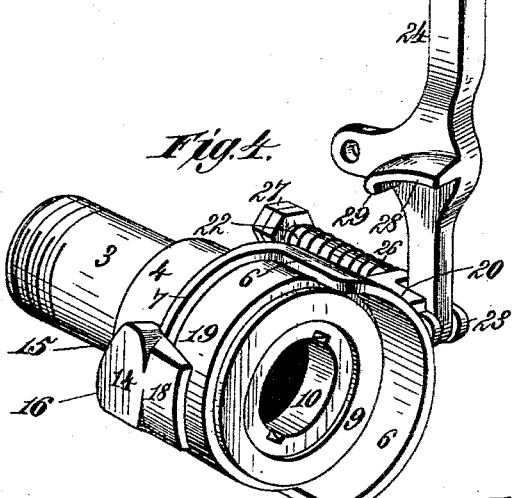
Witnesses,
Robt Everett
J. A. Rutherford
Inventor:
Edwin A. Leland.
By James L. Norris
Atty.

UNITED STATES PATENT OFFICE.

EDWIN A. LELAND, OF BROOKLYN, NEW YORK, ASSIGNOR TO LEONARD RICHARDSON, OF SAME PLACE.

BRAKE-HOSE COUPLING.

SPECIFICATION forming part of Letters Patent No. 412,103, dated October 1, 1889.

Original application filed April 11, 1889, Serial No. 306,787. Divided and this application filed June 18, 1889. Serial No. 314,715.

(No model.)

*To all whom it may concern:*

Be it known that I, EDWIN A. LELAND, a citizen of the United States, residing at Brooklyn, in the county of Kings and State of New York, have invented new and useful Improvements in Brake-Hose Couplings, of which the following is a specification.

My present invention relates to that class of pipe-couplings employed for connecting the air or steam pipes upon railway-cars for operating the brakes or heating the interiors.

The purpose of the invention is to provide simple means for detachably connecting the pipe or hose sections, flexibly attached to the train-pipes in such manner that upon uncoupling the cars an automatic disengagement of the pipe-coupling will take place the moment either uncoupled car is pulled apart from the other.

It is my further purpose to provide a simple and comparatively inexpensive construction, whereby the pipe-coupling devices are positively locked in engagement with the opposite pipe-section to prevent accidental release from any cause.

The invention consists in the novel features of construction and new combinations of parts, hereinafter described and claimed.

Referring to the accompanying drawings, Figure 1 is a side elevation showing the coupling in use. Fig. 2 is a plan view. Fig. 3 is a central or axial section of one of the coupling-sections. Fig. 4 is a perspective view of one of the coupling-sections.

In the drawings, the reference-numeral 1 denotes the hose-sections connected to the ends of the air or steam pipes 2 beneath the cars, such as are used in the Westinghouse and other brakes. Upon the end of each flexible hose-section is mounted a coupling consisting of a short metallic pipe 3, tapped into a substantially cylindrical block 4, the male thread on one and the female thread on the other being cut to comprise a portion only of the engaging surfaces, leaving a space 5 on each, wherein the parts are connected by surface contact only, as seen in Fig. 3; hence the weakening of the tube caused by its thread is without injurious effect, as this portion is carried into the body of the block and the whole strain and leverage are thrown upon the body thereof, where its full strength is available, instead of upon the last thread of the male screw, as would be the case were the threading continued to the mouth of the opening in block. The section 4 is formed with an exterior semicircular projecting shell 6, the outer portion being cut away as far back as a rib 7, which runs around and meets the longitudinal edge of the half shell 6. Within the latter is formed a seat 8, receiving a packing-ring 9, and within said ring is inserted a thimble 10, having a flange 12, which seats upon a margin $9^a$, formed on the inner edge of the ring. The thimble is tapped into the open end of the coupling-section 4 and holds the packing-ring firmly in place.

Upon one side of each coupling-section is formed a boss or projection 14, provided upon its rear with two different convex cam surfaces or curves 15 and 16, struck from different centers, but passing one into the other at a point between the upper and the lower end of the boss. The boss 14 is provided with a forwardly-projecting guide-piece 18, which lies upon the side opposite the semicircular shell 6 and separated a little from the peripheral face 19, which is formed by cutting away the metal back to the rib 7, thus forming a space which receives the semicircular shell 6 upon the other coupling-section, and which is guided to its seat by the piece 18. Upon the opposite side of the coupling-section is formed an angle-bracket 20, one part 21 thereof being drilled to receive a bolt 22, having a forked end 23, within which is pivotally mounted one end of a lever 24. One fork of the bearing 23 lies in a groove 25, formed in the other part of the bracket 20, and a strong coiled spring 26 encircles the bolt, bearing against the nut 27 and the rear face of the angle-bracket, thereby drawing the bolt rearward until its forked end strikes the drilled part 21 of the bracket. Upon the inner face of the locking-lever 24 is formed or mounted a laterally-projecting and curved cam-flange 28, which engages the double cam-curve 15 16 on the boss 14. Upon the end of the cam-flange 28 is formed a lug or detent 29.

The construction of each coupling-section with its adjuncts is the counterpart of the other section, the levers and bosses, respectively, being arranged upon alternate sides. Upon each lever is formed an ear or point, to which is attached one end of a chain or cord 30, connected at its other end to the car and having a slack or length somewhat less than that of the flexible pipe 1, whereby upon separation of the cars after uncoupling, the chains will draw upon and disengage the locking-cam levers before any strain is exerted upon the pipes.

The operation of the coupling is apparent. As the coupling-sections are brought together and the levers 24 are thrown down into horizontal position, or substantially so, the cam-flange 28 engages the double cam-curve on the boss 14 and passes over its greatest convexity, the spring 26 yielding sufficiently to permit the engagement, but having such tension as to effect a perfect coupling. The lug 29 on the top of the cam-flange, resting upon the top of the boss 14, prevents the lever from dropping too far, while the greater convexity of the cam-face 15 16 bearing on the cam-flange 28 above the line of strain retains the lever in locking engagement as effectually as a positive locking device. The point where the two cam-curves 15 and 16 meet may be differently located upon the boss relatively to the two ends of the compound curve.

I do not herein claim that which is described and claimed in my Letters Patent No. 408,116, dated July 30, 1889, for the present application is a division of the application on which my said patent issued.

What I claim is—

1. The combination, with the separate sections of a hose-coupling having side bosses each formed with two convex cam-surfaces struck from different centers, of the pivoted locking-levers each having on its inner side a laterally-projecting and curved cam-flange provided at its upper end with a detent-lug to rest upon the upper side of one of the cam-bosses when the cam-flange of the lever is in engagement with the two convex cam-surfaces of such boss, substantially as described.

2. The combination, with the separate sections of a hose-coupling having side bosses each formed with two convex cam-surfaces struck from different centers, of pivoted lengthwise spring-yielding locking-levers each having on its inner side a laterally-projecting cam-flange provided with a detent-lug to rest upon one of the cam-bosses when the cam-flange on the lever is in engagement with the two cam-surfaces of such boss, substantially as described.

3. In a brake-hose coupling, the combination, with two separate coupling-sections, of locking-levers pivoted upon movable bearings, and springs normally retracting said bearings, each coupling-section being provided with a boss having upon its rearward face two convex cam curves or faces struck from different points and meeting between the top and bottom of the boss, and each locking-lever being provided with a cam-flange having a lug or detent at its upper end to strike the upper side of a boss when the cam-flange is in engagement with the two convex cam-surfaces of such boss, substantially as described.

4. In a brake-hose coupling, the combination, with two separate coupling-sections each having a boss 14, provided with two rearward cam-faces 15 and 16, of locking-levers 24, pivoted upon spring-retracted bearings and provided with cam-flanges 28, having lugs or detents 29 at their ends, substantially as described.

In testimony whereof I have affixed my signature in presence of two witnesses.

EDWIN A. LELAND.

Witnesses:
EMMA W. L. BLATZ,
JOS. S. MICHAEL.